(12) United States Patent
Dörrie et al.

(10) Patent No.: US 7,037,200 B2
(45) Date of Patent: May 2, 2006

(54) COUPLING ARRANGEMENT

(75) Inventors: Swen Dörrie, Hezogenaurach (DE); Richard Baier, Herzogenaurach (DE); Georg Draser, Nürnberg (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 10/694,588

(22) Filed: Oct. 27, 2003

(65) Prior Publication Data

US 2004/0121846 A1    Jun. 24, 2004

(30) Foreign Application Priority Data

Dec. 20, 2002    (DE) ................ 102 59 931

(51) Int. Cl.
*F16D 7/10*    (2006.01)

(52) U.S. Cl. .......................... 464/35; 192/45

(58) Field of Classification Search ................ 464/35, 464/41; 192/45
See application file for complete search history.

(56) References Cited

U.S. PATENT DOCUMENTS

| | | | | |
|---|---|---|---|---|
| 3,256,751 A | * | 6/1966 | Tuck et al. | ........... 192/45 X |
| 5,511,642 A | * | 4/1996 | Klotz et al. | ........... 192/45 |
| 6,161,668 A | * | 12/2000 | Le Calve et al. | |
| 6,394,250 B1 | * | 5/2002 | Ouchi | ........... 192/45 |

FOREIGN PATENT DOCUMENTS

| | | |
|---|---|---|
| DE | 923760 | 2/1955 |
| DE | 1128229 | 5/1964 |
| DE | 3138466 | 4/1983 |
| DE | 3241247 | 5/1984 |
| DE | 4238147 | 5/1994 |
| DE | 19511188 | 4/1996 |
| DE | 19535889 | 4/1997 |
| DE | 19626959 | 1/1998 |
| DE | 19807108 | 8/1998 |
| EP | 0447026 | 9/1991 |
| EP | 1067303 | 1/2001 |

* cited by examiner

*Primary Examiner*—Greg Binda
(74) *Attorney, Agent, or Firm*—Volpe and Koenig, P.C.

(57) ABSTRACT

A coupling arrangement (1) with a first clamping ring (10) concentric to the axis of rotation (1*a*), a second clamping ring (20) oriented concentrically with the axis of rotation and grooved around its circumference, and with clamping bodies (30) oriented radially between the clamping rings (10, 20); which includes on at least one of the clamping rings projections (11) that are built into a shape like a ramp (10, 20), each of which is placed between two neighboring clamping bodies; and which includes a first retainer (15) and a second retainer (25), with which the clamping rings (10, 20) and the clamps (30) are held together.

16 Claims, 10 Drawing Sheets

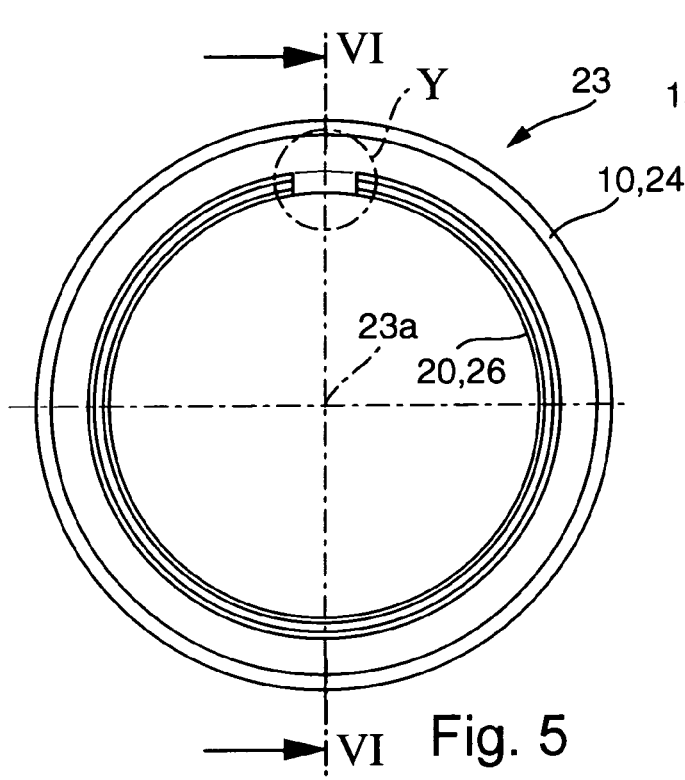
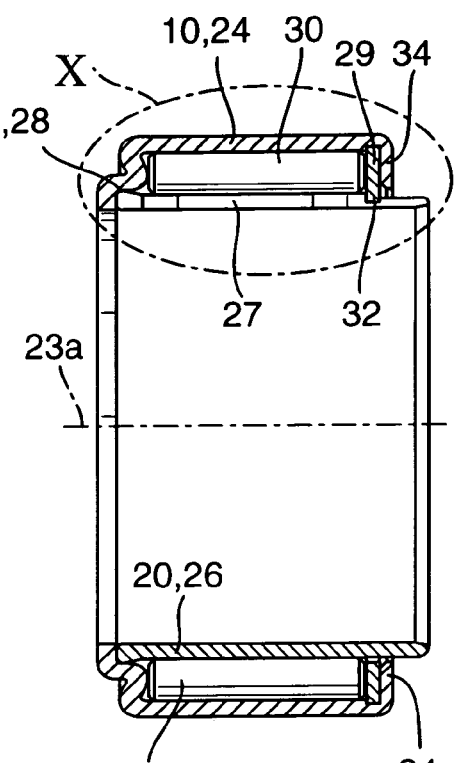
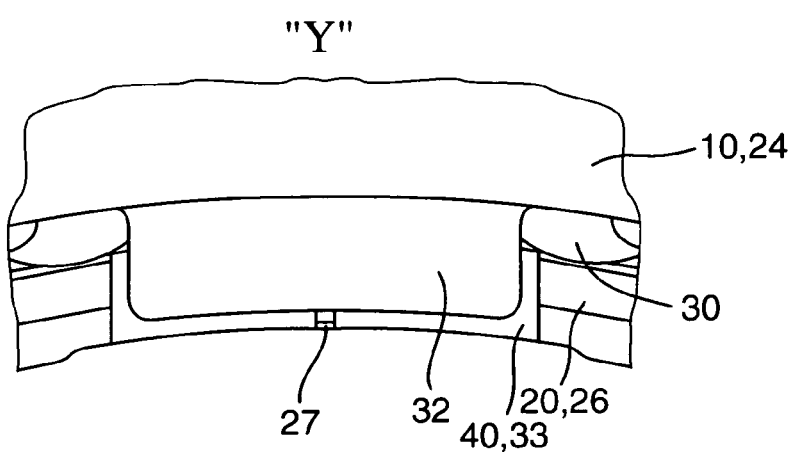
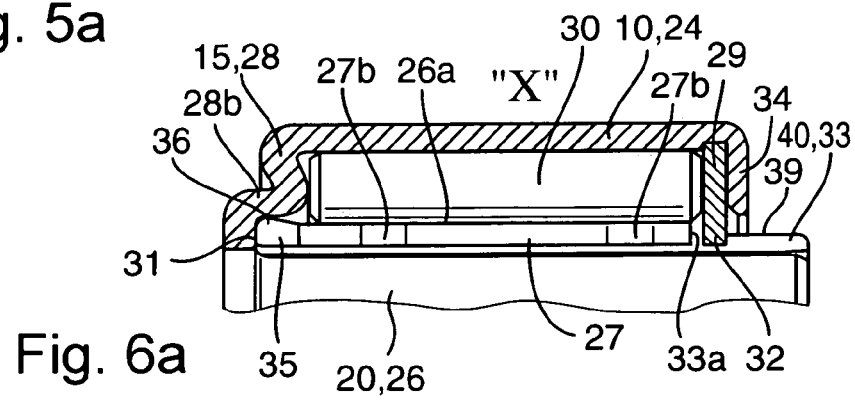

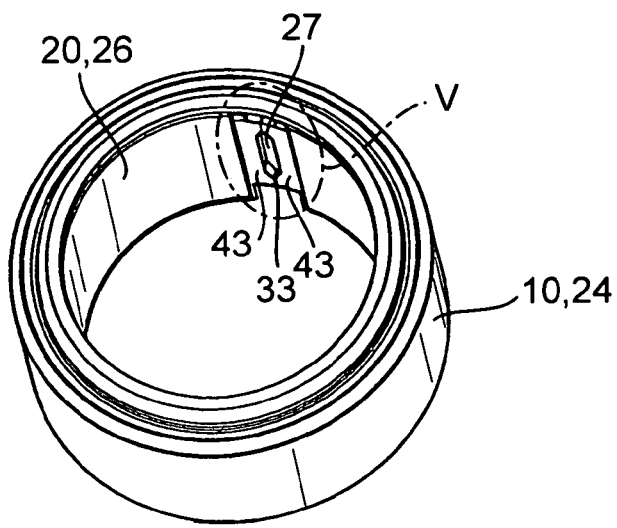
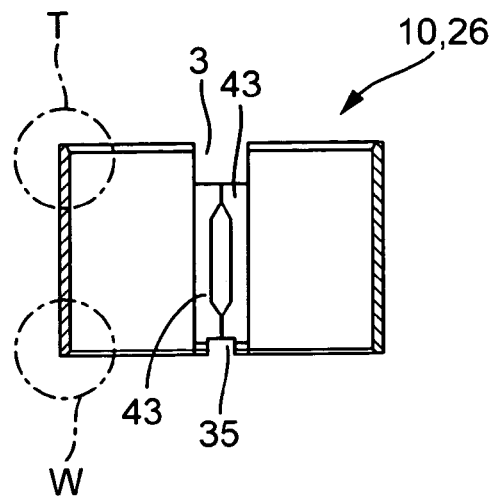
Fig. 11
Fig. 12
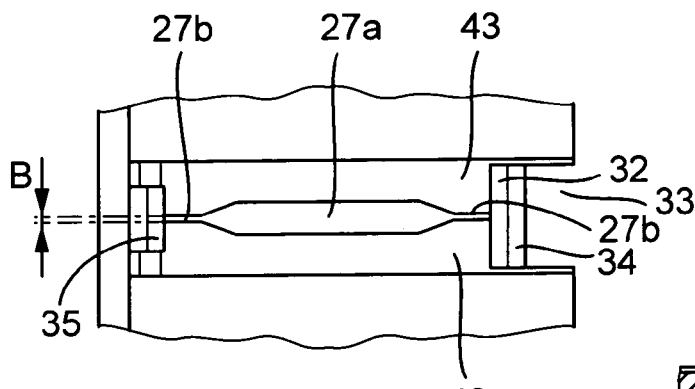
Fig. 11a
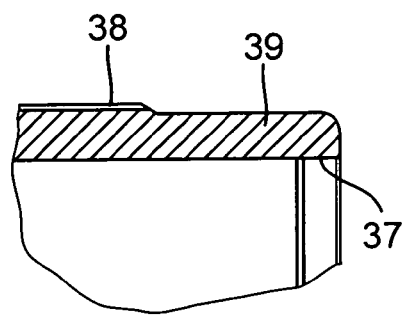
Fig. 12b
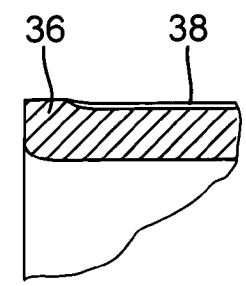
Fig. 12a
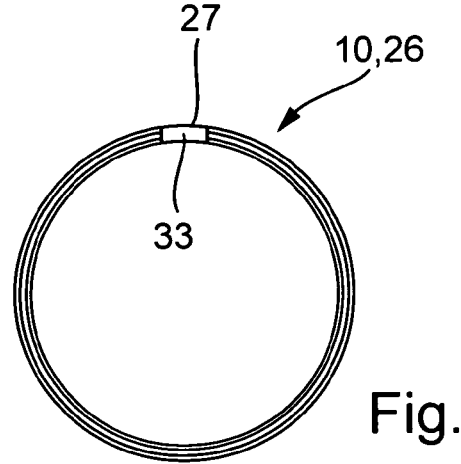
Fig. 13

COUPLING ARRANGEMENT

BACKGROUND

The present invention is directed to a coupling arrangement with a first clamping ring, a second clamping ring, as well as clamping bodies, which are placed radially between the clamping rings, which are fitted inside each other, and concentrically about an axis of rotation.

This kind of coupling device is arranged between two rotating machine parts with differing relative RPMs, and which move in the same or opposed directions about an axis of rotation in a drive train, for example in an automobile transmission, or belt drive system. Power can be transferred between the machine parts through the coupling arrangement. These kinds of coupling arrangements are self-engaging or engagable free-wheels and clamp-type couplings. The difference between coupling arrangements that work one-way and those that work both ways should be noted. By means of coupling arrangements that work one way, a rotatable connection in a single direction of rotation about an axis of rotation may be made between two machine parts. Coupling arrangements that work both ways are able to make a rotatable connection between two machine parts about an axis of rotation in either a clockwise or counter-clockwise direction. Each clamping ring is permanently rotatably fixed to one of the machine parts, or is able to be rotatably fixed to a machine part. The machine parts are usually at least partially positioned inside one another, radially and concentrically; The clamping rings are placed radially between the machine parts and the clamping bodies are located between them. At least one of the clamping rings has a bearing surface facing one of the clamping bodies with at least one projection situated radially in the area of displacement of at least one of the clamping bodies. The projections are arranged in one-sided or two-sided ramplike fashion circumferentially or on the side tangentially facing the clamping bodies. Speed (RPM) differentials and speed adaptations or rotating movements between the clamping rings force the clamps up against the projections, so that the clamping bodies climb up or clamp onto the ramp. The clamping bodies are then clamped between the clamping rings. A disengagable connection in the direction of rotation is thereby created between the machine parts.

The engagable coupling arrangements that make up this technology may furthermore have an actuating element. The actuating element brings about the difference in RPM or speed adaptation between the clamping rings by restricting, holding in place, or stopping the movement of one clamping ring relative to the other. These coupling arrangements are used for example in differentials and transfer cases. For example, four wheel drive may be engaged by means of this coupling arrangement. An inner clamping ring is placed on a shaft. An outer clamping ring surrounds the inner one. Clamping bodies are enclosed radially by the clamping rings. The outer clamping ring has ramplike, radial projections that protrude between the clamping bodies. Furthermore, the outer clamping ring is interrupted by a continuous groove in the circumferential direction. The clamping rings may be rotated relative to each other at an angle, and about the axis of rotation of a shaft via an actuating element. The actuating element is fitted to the inner clamping ring. The actuating element is positioned to come into contact with the outer clamping ring. On the outer clamping ring there is an outer machine part that may be turned to the outer clamping ring, for example a gear wheel. The outer machine part is separated from the outer clamping ring in such a way that a relative movement between the outer machine part and the outer clamping ring around the axis of rotation is possible while the clamping bodies are free from the ramp-like projections. A rotating movement of the shaft swivels the actuating element. The actuating element in turn acts upon the outer clamping ring in such a way that mechanical linkage is established between the clamping bodies and the ramp-shaped projections. Forces acting on the projections force the grooved outer clamping ring to spring back elastically. The forces change the outside diameter of the outer clamping ring, which comes into contact with the outer machine part in such a way that power may be applied between the machine parts through the coupling arrangement. The grooved clamping rings are knows as "slipper rings" in the trade.

The manufacture of the clamping rings for the coupling arrangement, especially the bearing surfaces with the ramp-like projections, is expensive, especially due to the machine finishing and cleaning of the bearing surfaces. The mounting of the individual parts of the coupling is relatively costly and time-consuming. Incorrect mounting and loss of parts is entirely possible. The storage and transport costs of the individual parts until their assembly by the manufacturer, i.e. a manufacturer of transmissions, are high.

SUMMARY

The object of the invention therefore, is to create a coupling arrangement that may be economically built and therefore economically mounted, and for which the storage and transport costs of the individual parts during production and mounting is sharply reduced.

This objective is accomplished by a coupling arrangement with a first clamping ring, a second clamping ring, and clamping bodies situated radially between the clamping rings. The clamping rings are fitted inside one another, concentrically with an axis of rotation, and at least a first retainer is provided on at least one of the clamping rings, and a second retainer is fixed in a longitudinal direction of the axis of rotation. At the same time the clamping rings and the clamping bodies are held together, in a longitudinal direction of the axis of rotation, by the retainers.

When the clamping rings move relative to one another, the clamping bodies between the first and second clamping rings are clamped. At least one of the clamping rings is fitted with a first retainer and with a second retainer. The clamping bodies and the clamping rings are held together along the axis of rotation by the retainers, and thereby joined into a single component assembly. The idea is for this component to be assembled by the manufacturer of the individual parts of the coupling arrangement. The transportation and storage costs for the individual parts are thereby reduced. The coupling arrangement, provided as a preassembled component, may then be mounted between the machine parts by the manufacturer, for example of transmissions, so that incorrect mounts and the loss of the coupling arrangement's individual parts is prevented during assembly.

The invention is designed in such a way that the retainers are spaced apart and are fixed to the first clamping ring in at least one direction of the axis of rotation. At the same time, the retainers engage the second clamping ring by edges or segments cut out of the second clamping ring, which face away from each other at least in a direction of the axis of rotation, at least partially, and which carry and surround the clamping bodies at least partially on both sides. By means of the clamping rings and retainers, the machine component is built in such a way that the clamping bodies are securely held in the coupling arrangement.

The invention is also designed in such a way that the clamping rings are formed sheet metal parts. The manufacture of such clamping rings is especially economical when mass-produced. The bearing surfaces with the ramp-like projections may be manufactured for example by drawing or rolling the metal, and do not need to be brushed free of shavings or chips afterwards. The manufacture of the clamping rings by drawing or stamping, or by rolling, or by a combination of these processes, conserves material. The materials used to manufacture the clamping rings are preferably metals made of case-hardened steel according to DIN 17210, marked with either 17Cr3 or 16MnCr5. The surface of the fittings is preferably hardened to 700+10HV10 ($Eht_{550}$=0.2–0.7).

Another element of the invention is that at least the first retainer is of a piece with the first clamping ring. The manufacture of the retainers is thus economically integrated into the finishing of the clamping rings. The design is such that the retainer is a lip protruding from the first clamping ring at a right angle to the axis of rotation, or one or more metal lips extending radially off the clamping ring.

Another element of the design is that at least one of the retainers is separate from the coupling arrangement's clamping rings, and held longitudinally against the first clamping ring in at least one longitudinal direction of the axis of rotation. It is preferable that the separately formed retainer be a perforated cap. The axis of rotation extends through the perforation of the perforated cap, whereby the perforated cap attaches itself longitudinally to the clamp in one direction. The perforated cap then engages a cut-out, longitudinally oriented section or edge of the second clamping ring, or, as provided for by the design, is equipped with at least one lip coming off the perforated cap. The lip engages the second clamping ring by at least one section or edge facing the longitudinal direction of the axis of rotation. It is preferable that the perforated cap be constructed by a punch method, which is simple and economical.

In the invention described above, either the first or second clamping ring includes a bearing surface with ramp-like projections. The design also provides for both clamping rings to be equipped with such a surface.

Other elements of the invention provide the coupling arrangement with a slipper ring. The coupling arrangement has at least one clamping ring oriented concentrically with the axis of rotation of the machine parts, and a second clamping ring oriented concentrically with the first, which is used as a slipper ring and therefore grooved through its circumference with a groove, making it changeable in circumference; the coupling arrangement also has clamping bodies oriented radially between the clamping rings. The second, grooved clamping ring includes a bearing surface facing the clamping bodies with jutting projections formed into a ramp-like shape that neighbor each other and point radially toward the clamping bodies.

It is preferable that the clamping rings be sheet metal parts formed using case-hardened steel, and that they exhibit the qualities described above. The second clamping ring is equipped, on the circumferential side facing away from the clamps, with a contact surface, which in turn is equipped with an interface surface for frictional contact with one of the machine parts. A continuous groove runs along the length of the second clamping ring; this groove extends from the machine part interface surface to the bearing surface and is of variable width in the circumferential direction of the second clamping ring, in such a way that when torque is transferred, the second clamping ring is elastic, and may be brought into frictional contact with the machine part, this by virtue of the clamping bodies that are up against the ramp-like projections, and clamped between the clamping rings.

It is preferable that either the first or second clamping ring be equipped with the retainers, where the retainers lie spaced across from each other in a longitudinal direction of the axis of rotation, and are fastened to one of the coupling (coupling arrangement) rings in at least one longitudinal direction of the axis of rotation.

The retainers take up and surround the other clamping ring, at least partially, by cut-out sections or edges longitudinal to the axis of rotation, and which face away from each other, and engage its/their edges. Furthermore, the clamping bodies that extend in a longitudinal direction of the axis of rotation are positioned between and held in place by the retainers.

At least the first retainer is preferably formed as one piece with the first clamping ring, and is preferably a lip made from the metal of the first clamping ring, and extends from it at right angles to the axis of rotation. As an alternative, at least the second retainer is made separate from the clamping rings, and is preferably held longitudinally to the first clamping ring in at least one longitudinal direction of the axis of rotation. In the aforementioned case, the second retainer is preferably a perforated cap. The perforated cap holds to the clamping body longitudinally in one direction, surrounding the axis of rotation. A further provision of the design is that the perforated cap be outfitted with at least one tongue coming off it. The tongue engages the second clamping ring by at least one edge or cut-out section oriented longitudinally with the axis of rotation. The design also provides that the edge or section includes a recess cut out of the second clamping ring. The recess extends longitudinally from the axis of rotation into the clamping ring.

Another preferred feature of the invention calls for a coupling arrangement where at least the first retainer is formed in one piece with the first clamping ring and at least the second retainer is separate from the clamping rings. The retainer is a lip protruding from the first clamping ring at a right angle to the axis of rotation, and is made from the metal of the first clamping ring. The second retainer is the perforated cap described above. Another feature of the unit is that the perforated cap has a protruding tongue, which engages the second clamping ring by a section or edge oriented in at least one longitudinal direction of the axis of rotation. This edge preferably comprises a recess in the second clamping ring, where the recess extends into the second clamping ring in a longitudinal direction of the axis of rotation.

For a coupling arrangement with metal clamping rings whose second clamping ring is a slipper ring that may be fixed about an axis of rotation relative to one of the machine parts by means of an actuating element, it is provided that the actuating element formed in one piece with the second clamping ring. Such an actuating element may for example be a recess in the second clamping ring, where the recess extends into the second clamping ring in a longitudinal direction of the axis of rotation, and where the recess may be pivoted relative to the first clamping ring by a catch acting on the coupling arrangement by entering the recess from the outside. Alternatively, the actuating element may be a longitudinal tongue extending in a longitudinal direction away from the second clamping ring, and built from the second clamping ring. The tongue, and thereby the second clamping ring, is oriented such that it may be rotated about the axis of rotation relative to the first clamping ring. Another alternative arrangement provided for by the invention is that the actuating element may be built separately but held longitudinally to the first, ungrooved clamping ring in at least one longitudinal direction of the axis of rotation.

For a unit with an actuating element, it is further provided that one of the retainers and one of the actuating elements be attached to and made from a common perforated cap with a tongue protruding at first radially from that perforated cap. The perforated cap is held to the first clamping ring in at least one longitudinal direction of the axis of rotation, and holds the clamping bodies longitudinally, and the axis of rotation extends through the perforation. The tongue first engages the second clamping ring, at right angles to the axis of rotation, by the edge of a recess in the second clamping ring, and then protrudes away from the edge longitudinally to the axis of rotation, and finally juts out of the recess and over the second clamping ring. In so doing, the upper part of the tongue comprises the actuating element and engages, for example, a catch (or something similar) on a rotating control part of the coupling arrangement, which may be rotated, at least relative to the first clamping ring. The recess in the second clamping ring has at least one width, tangential to the circumferential direction, which corresponds to the tangential width of the tongue plus a pivot distance for the circumferential pivoting (rotation of the tongue about the axis) of the tongue inside the recess. The pivot distance is given by the angular position, around which the tongue in the gap/catch may be pivoted to engage or disengage the clamping of the clamping bodies to the clamping rings.

Other features of the invention have to do with the relative positions of the clamping rings. The first clamping ring surrounds the second one a least partially. In so doing, the retainers point away from the first clamping ring and inwards in the direction of the axis of rotation and at right angles to it, and at least partially take up and surround the second clamping ring longitudinally to the axis of rotation. In so doing, the bearing surface on the second, grooved clamping ring points away from the axis of rotation and towards the outside. During the coupling process; the second clamping ring deflects radially inwardly, whereby the width of the groove shrinks and contact is established with one of the machine parts inside the coupling arrangement. As an alternative, the first clamping ring may be arranged inside the second one. In this arrangement, the retainers point out radially from the first clamping ring at right angles to the axis of rotation and away from the axis of rotation, and hold the second clamping ring, at least partially, longitudinally to the axis of rotation. The bearing surface with the ramp-like projections on the second clamping ring points in the direction of the axis of rotation. During the clamping process, the second clamping ring springs up radially, whereby frictional contact with the outer machine part in the coupling arrangement may be established.

Alternatively, the first clamping ring with the retainers may exhibit a cylindrical bearing surface, or analogously to the second clamping ring, a bearing surface with projections formed into the shape of a ramp. If both clamping rings are equipped with such projections, the coupling arrangement may selectively be used to transfer torque in one or both directions of rotation, clockwise or counter-clockwise.

BRIEF DESCRIPTION OF THE DRAWINGS

In the following pages, the invention will described more thoroughly on the basis of a preferred embodiment. In the drawings:

FIG. 5 is another example of the coupling arrangement as a separate component, without any machine parts.

FIG. 5a is an enlarged view of detail Y from FIG. 5.

FIG. 6 is a cross section of the coupling arrangement as in FIG. 5 taken along the line VI—VI.

FIG. 6a is an enlarged view of detail X from FIG. 6.

FIG. 8 is a view of the perforated cap of the assembly component shown as an individual component, as in FIGS. 5 and 6a.

FIG. 11 is a view of the coupling arrangement as an assembly component as in FIG. 5, depicted as a whole without the machine parts.

FIG. 11a is an enlarged view of detail V from FIG. 11.

FIG. 12 is a longitudinal section through the inner coupling arrangement ring of the coupling arrangement as in FIG. 11.

FIG. 12a is an enlarged view of detail T from FIG. 12.

FIG. 12b is an enlarged view of detail W corresponding to FIG. 12.

FIG. 13 is a view of the inner coupling arrangement ring corresponding to FIG. 12 as seen from the front.

DETAILED DESCRIPTION OF THE PREFERRED EMBODIMENTS

Figure 1:
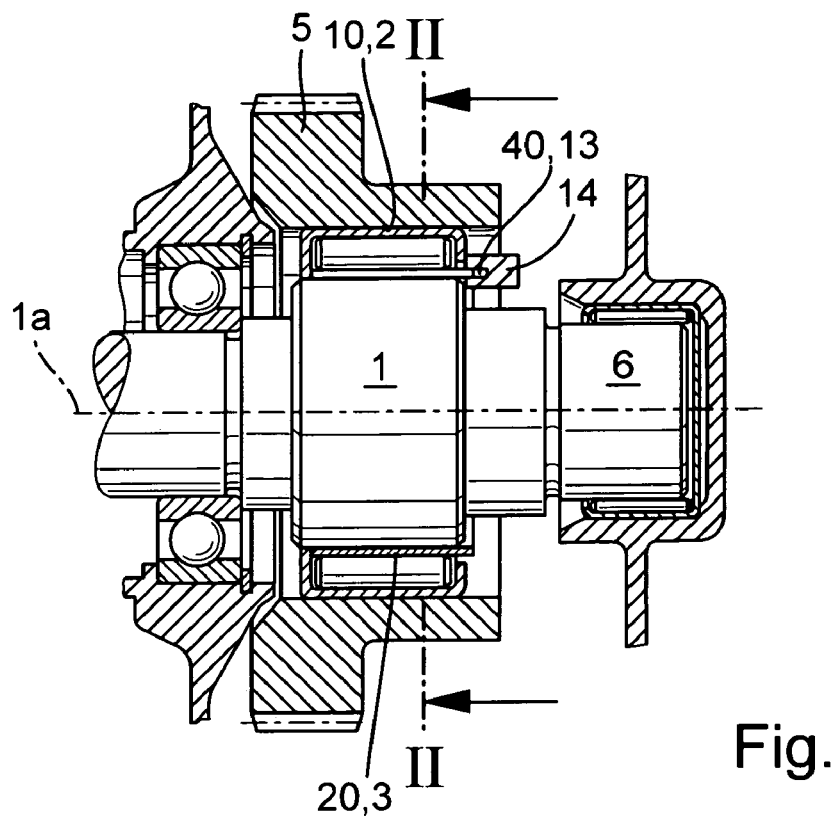
FIG. 1 is a longitudinal section of a coupling arrangement according to the invention.
Figure 2:
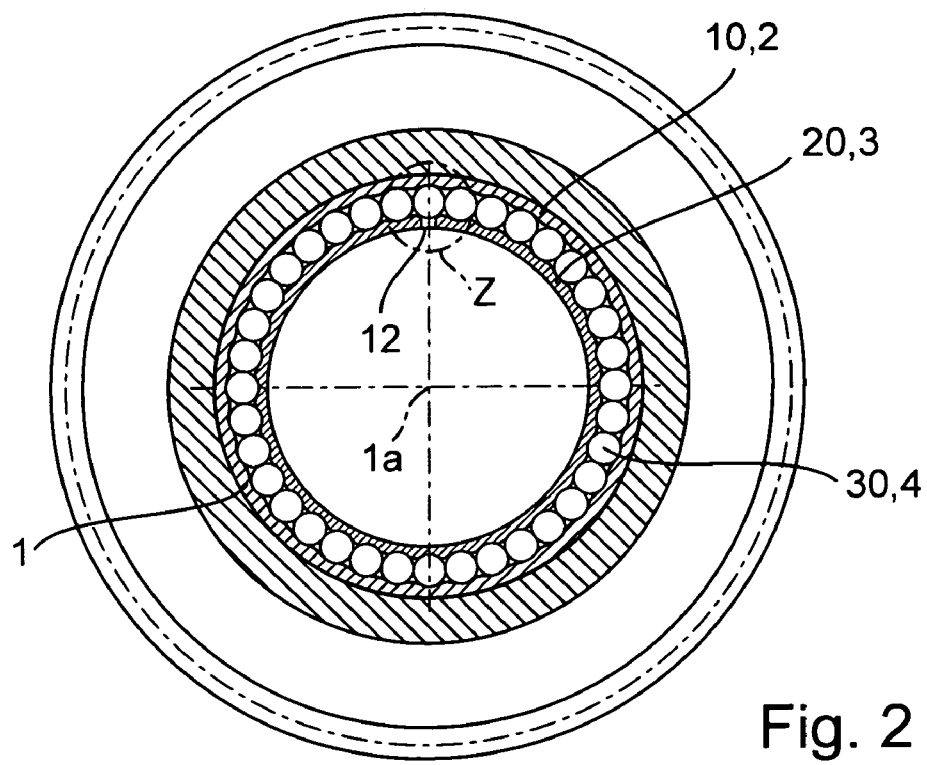
FIG. 2 is a cross section of the invention depicted in FIG. 1.
Figure 2A:
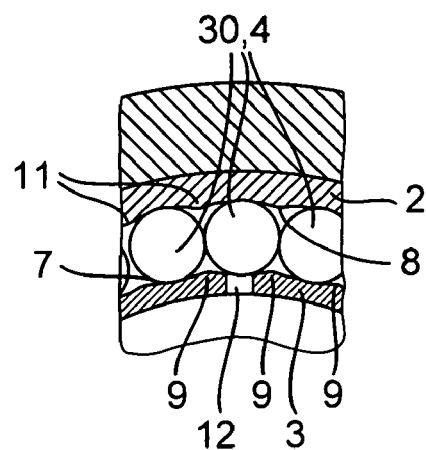

FIGS. 1 and 2 depict a coupling arrangement 1, with an outer clamping ring 2 as the first clamping ring 10, and an inside clamping ring 3 as the second clamping ring 20, with cylinder rollers 4 as clamping bodies 30, and with an actuating element 40. The coupling arrangement 1 is placed between a gear wheel 5 and a shaft 6. The outer clamping ring 2 is firmly mounted in the gear wheel 5. When the coupling arrangement 1 is not engaged, the inner clamping ring 3 may be turned relative to the shaft 6. The coupling arrangement 1 is equipped with a full complement of clamping bodies 30. As follows from especially FIGS. 2a, 3 and 4, both the outer clamping ring 2 and the inner clamping ring exhibit bearing surfaces 7 or 8, which are equipped with projections 9 or 11 that are formed with a ramp-like shape and placed radially next to the clamping bodies 30. Each of the clamping bodies 30 is assigned to a projection 9 or 11 in a clockwise or counter-clockwise pivot direction. The projections 9 are formed on the outer surface of the inner clamping ring 3 and stand out radially from the bearing surface 7. The projections 11 are formed on the inner surface of the outer clamping ring and point radially inwardly from the bearing surface 8.

Figure 16:
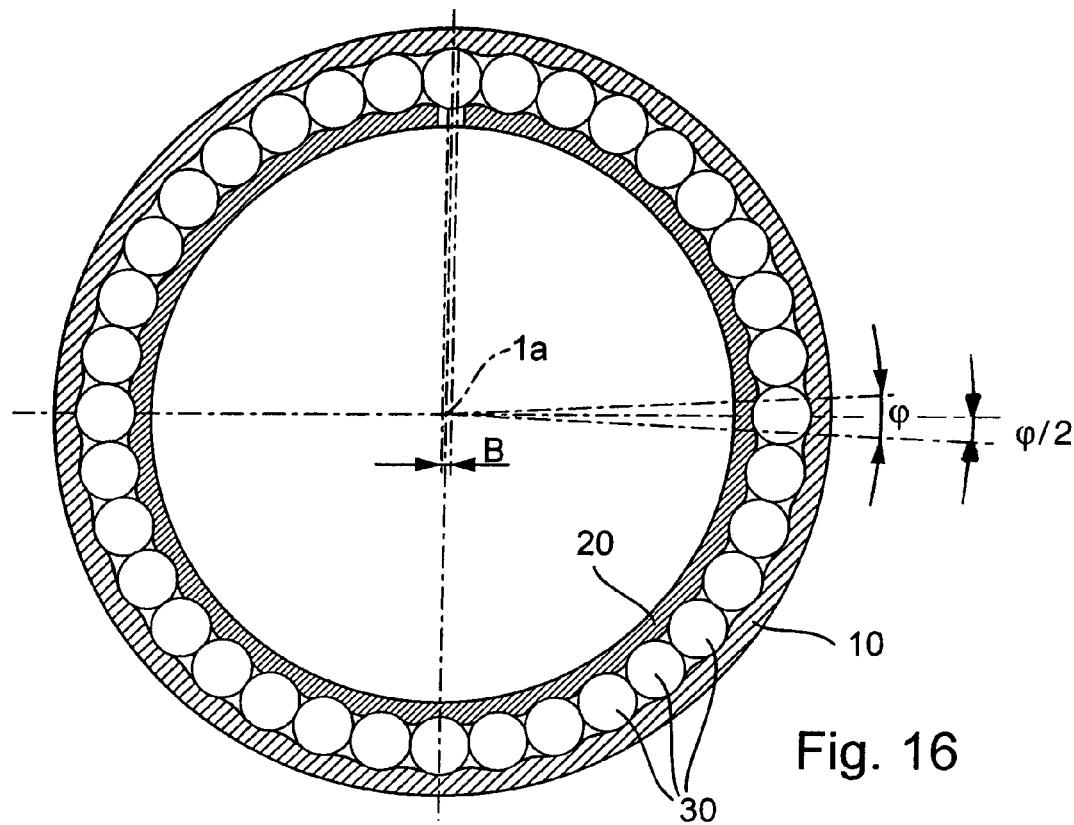
FIGS. 16, 17 are views providing a description of the principle behind a bi-directional coupling arrangement.
Figure 17:
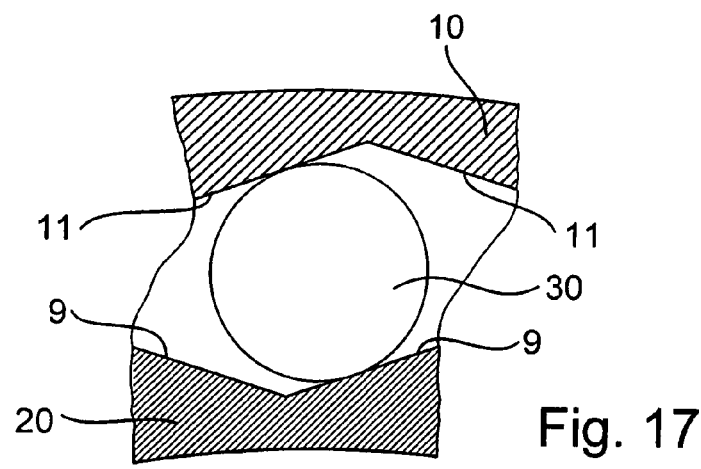

The second clamping ring 20 is a slipper ring and includes a continuous groove extending in a longitudinal direction of the axis of rotation 1a. The actuating element 40 extends from the coupling arrangement 1 in the same direction as the axis of rotation 1a, in the form of a tongue 13 that is formed as one piece with the inner clamping ring. The tongue 13 juts toward the outside of the coupling arrangement 1, into a catch 14, not depicted in greater detail, which is outside of the coupling arrangement. When the catch 14 rotates around the axis of rotation 1a, around half the rotation angle φ in one of the directions of rotation, the clamping bodies 30 rise up the ramp-like projections 9 and 11 (FIGS. 16 and 17). The clamping bodies 30 clamp fast between the ramps. In so doing, the inner clamping ring 3 is caused to give inwards in the direction of the axis of rotation, which causes the width B of the groove 12 to diminish. The shaft 6 and the inner clamping ring 3 are then made to rub together. Torque may then be applied through the coupling arrangement 1 between the gearwheel 5 and the shaft 6.

Figure 4:
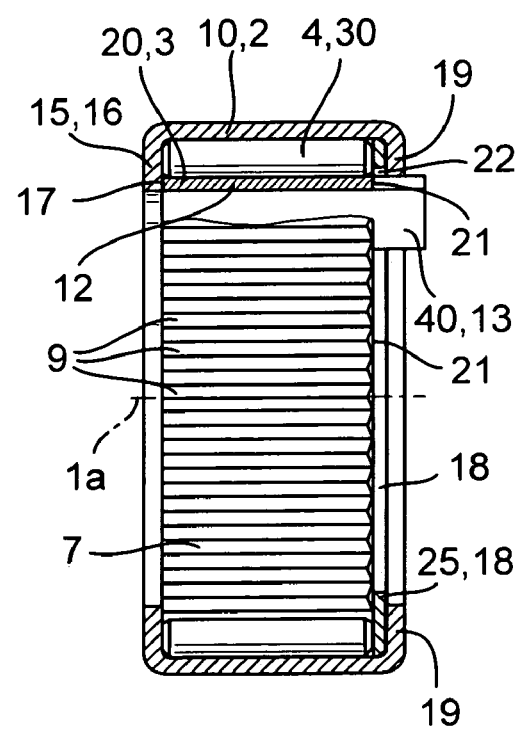
FIG. 4 is a view of the coupling arrangement shown as a separate component, without any machine parts in the cross section.

The coupling arrangement 1 is, as depicted in FIG. 4, pre-assembled into a single component. To that end, the outer clamping ring 2 includes a first retainer 15 as well as a second retainer 25. The first retainer 15 is designed as a lip that is formed in one piece with the outer clamping ring. The lip points radially inwardly from the outer clamping ring 2 in toward the axis of rotation 1a, and in so doing engages the inner clamping ring 3 by a section 17 cut out from the frontal side. The second retainer 25 is a perforated cap 18. The perforated cap 18 is a punched component and is held to the outer clamping ring by means of an additional lip in one of the longitudinal directions of the axis of rotation. The first retainer 15 and the second retainer 25 hold the second clamping ring 20 between them longitudinally, whereby the retainers 15, 25 hold longitudinally to the clamping bodies 30. In so doing, the perforated cap 18 grabs onto the inner clamping ring by means of a cut-out segment 21 facing longitudinally away from another cut-out segment 17. The tongue 13 extends through the perforated cap 18 at a catch 22 in the perforated cap 18 that is not further depicted, and which faces radially outward from the hole in the perforated cap, in such a manner that the actuating element 40 may rotate about the angle φ inside the catch 22.

Figure 3:
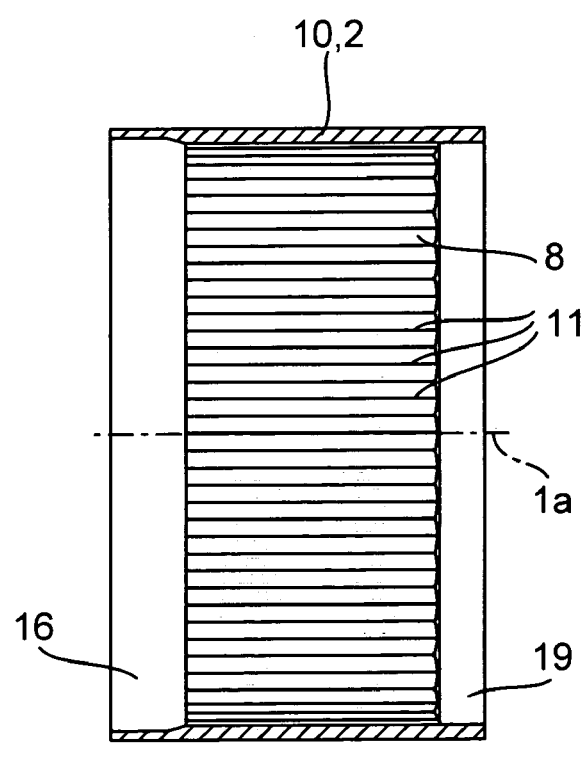
FIG. 3 is a view of the outer clamping ring of the coupling arrangement, as in FIG. 1, shown individually.

FIG. 3 shows the outer clamping ring before mounting along with the other elements of the coupling arrangement 1. The outer clamping ring 2 as well as the inner clamping ring 3, are formed metal parts. It is preferable that the clamping rings (2, 3) be sheet metal parts formed using case-hardened steel. Alternatively, other suitable materials may be used to form the clamping rings. Upon assembly, the lips 16 and 19, are bent radially inwardly towards the axis of rotation by roll crimping.

FIGS. 5 and 6 show another embodiment of a coupling arrangement 23. In the coupling arrangement 23, the first clamping ring 10 is an outer clamping ring 24, and the second clamping ring 20 is an inner clamping ring 26. The outer clamping ring 24 includes a first retainer 15 and a second retainer 25. The first retainer 15 is a lip 28 that is formed in one piece with the outer clamping ring 24, and is made as a stamped part. The second retainer 25 is a perforated cap 29. The lip 28 points radially inwardly from the outer clamping ring toward the axis of rotation 23a, and engages the inner clamping ring 26 by a ring-shaped section 31 cut out of the frontal side. The perforated cap 29 holds the clamping bodies 30 in a longitudinal direction of the axis of rotation 23a, and includes a tongue pointing radially inwardly 32 (FIG. 6a, FIG. 6). The tongue 32 engages behind the inner clamping ring 26 by a section 33a cut out of a recess 33 in the inner clamping ring 26. The perforated cap 29 is secured to the outer clamping ring in the longitudinal direction of the axis of rotation 23a, by means of an additional lip 34. The inner clamping ring 26 and the clamping bodies 30 are thereby held longitudinally to the outer clamping ring 24 by the retainers 15 and 25.

Figure 6B:
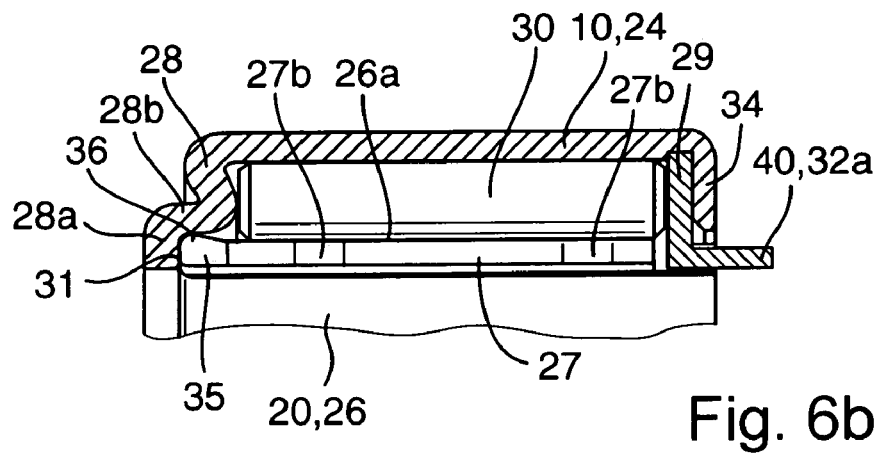
FIG. 6b is an enlarged view of detail X from FIG. 6 with an alternative design of the perforated cap.
Figure 7:
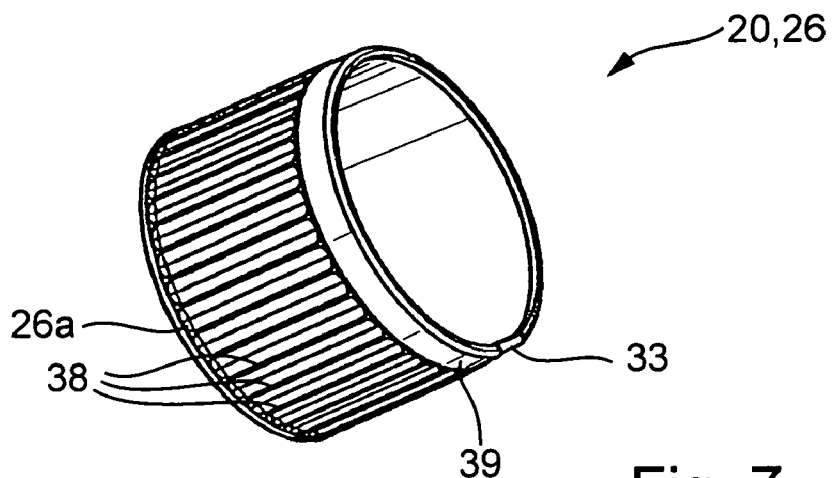
FIG. 7 is a view of the inner clamping ring of the coupling arrangement shown as an individual component, as in FIG. 5.
Figure 8:
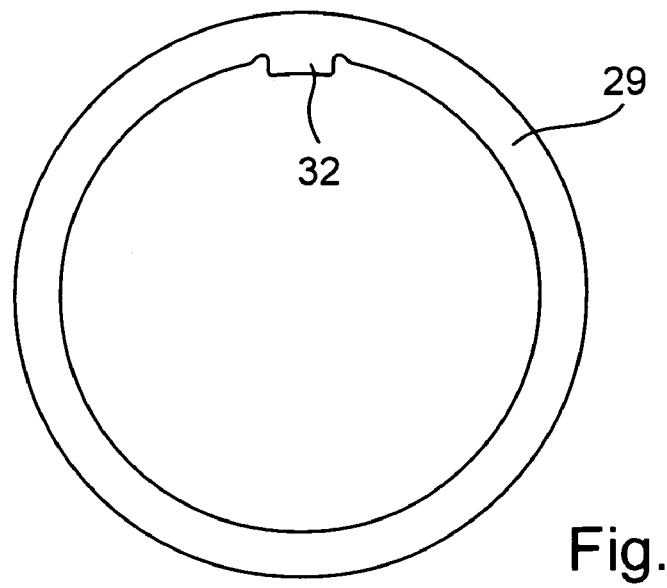

The inner clamping ring 26 is a slipper ring in the form of a hollow cylinder, and includes a groove 27 (FIG. 13). The inner clamping ring is a metal part produced essentially by metal forming. The characteristics of such a clamping ring 26 are shown in FIGS. 11 to 13. A drawn part of the inner clamping ring 26 in the shape of a bowl is reduced circumferentially in the thickness of the sheet material at the segments 43 touching the groove 27 (FIG. 11a). At first the groove 27 has not been fully cut through on the bowl, but rather punched outward at the recess 27a. To the left and right along the longitudinal direction of the recess 27a, there are predetermined breaking points 27b (FIGS. 6A & 11A). Connected to the predetermined breaking points in the longitudinal direction of the inner clamping ring 26, are the recess 33 on one end and the recess 35 on the other. The inner clamping ring 26 is at first kept closed over the predetermined breaking points. After the brim (not pictured) has been pulled off and after a hole has been made in the bottom of the bowl (not pictured), there will be edges 36 and 37 that point radially outwardly (and inwardly) left behind on the inner clamping ring (FIG. 12a, FIG. 12b). There are ramp-shaped projections 38 located on the outside of the bearing surface 26a of the inner clamping ring 26 (FIGS. 6a, 6b, and 7). The projections 38 cross longitudinally into the edge 36 (FIG. 12a). A cylindrical section 39 connects to the projections 38 at the height of the recess 33 (FIG. 7, FIG. 12b). The inner clamping ring 26 remains closed circumferentially during the hardening and shaping process taking place over the predetermined breaking points, so that on the one hand the stability of the shape of the cylindrical ring is secured, and on the other hand so that during processing, the ring does not get caught on any other fittings by the groove 27. The circumferentially separated inner clamping ring 26, terminated at the predetermined breaking points 27b, exhibits the functional measurement (B) of the groove 27 after the separation of the predetermined breaking points (FIGS. 11a and 16).

Figure 9:
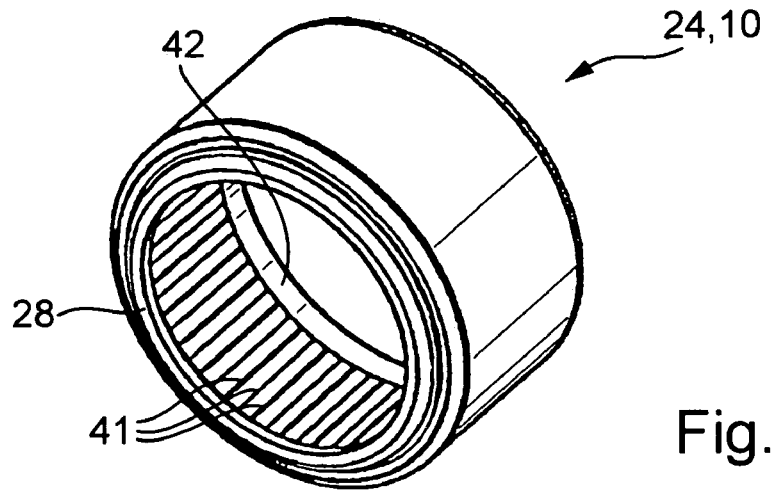
FIG. 9 is a view of the outer coupling ring of the coupling arrangement seen as a whole, as in FIG. 5
Figure 10:
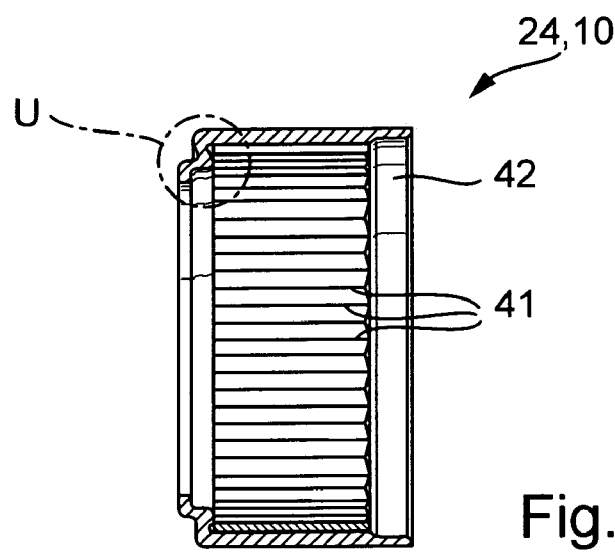
FIG. 10 is a longitudinal section of the coupling ring as in FIG. 9.
Figure 10A:
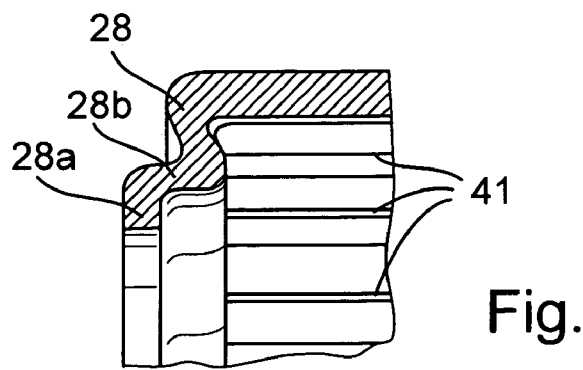
FIG. 10a is an enlarged view of detail U from FIG. 10.

The outer clamping ring 24 (FIGS. 9, 10, and 10a) is, like the inner clamping ring 26, a cold-formed metal part. The inside surface area of the outer clamping ring 24 is provided with ramp-like projections 41. The ramp-like projections 41 extend longitudinally out from the lip 28 and terminate, seen longitudinally, in an at first cylindrical segment 42, which upon mounting the coupling arrangement 23 is moved over to the lip 34 holding the perforated cap 29 in place. Initially, the lip 28 is supposed to hold the clamping bodies 30 axially and is therefore bent backwards slightly inside the inner part of the outer clamping ring 24 (FIG. 10A). The material of the lip 28 is then bent longitudinally further backwards, and is thereby oriented toward the axis of rotation, and finally angled inward by an edge.

Inside the coupling arrangement, the edge 28a engages the inner clamping ring 26 by the cut-out segment 31 (FIG. 6a). The horizontally oriented hollowed cylindrical ring-shaped segment 28b of the lip 28 then bridges the longitudinal gap made by the edge 36 between the cogs 38 and the frontal side, so that the clamping bodies 30 do not touch the edge 36 (FIGS. 6a and 6b). The cylindrical segment 39 of the inner clamping ring 26 juts out longitudinally (at least partially so) from the outer clamping ring, at least partially, causing the recess 33 to jut out in so doing, so that a catch (not depicted) fitted outside the coupling arrangement 23 can grab the recess 33, which is designed as an actuating element 40.

The perforated cap 29 catches the recess 33 with the tongue 32 and may be freely rotated about the coupling arrangement's 23 axis of rotation 23a relative to the outer clamping ring 24 (FIG. 6). FIG. 6b shows an alternate design of the coupling arrangement 23 with modifications to the inner clamping ring 26 and the perforated cap 29. Here the inner clamping ring 26 does not exhibit the cylindrical segment 39 and thereby juts out over the outside of the outer clamping ring 24. The perforated cap 29 includes an angled catch 32a on the tongue 32, which engages into the actuating element and may be rotated about an angle Φ over the inner clamping ring 26, as depicted in FIG. 16.

Figure 14:
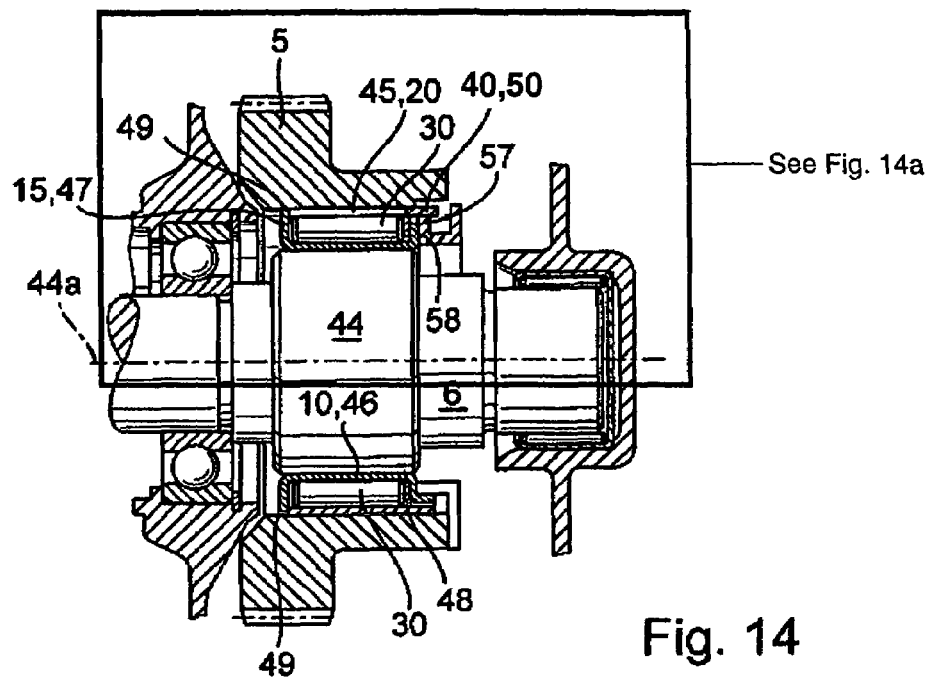
FIG. 14 is a view of another embodiment of a coupling arrangement in longitudinal section.

FIG. 14 shows another embodiment of a coupling arrangement. The coupling arrangement 44 is placed between the gearwheel 5 and the shaft 6 and is comprised of an outer clamping ring 45, an inner clamping ring 46, and clamping bodies 30. In the coupling arrangement 44, the first clamping ring 10 is the inner clamping ring 46, and the second clamping ring 20 is the outer clamping ring 45. The inner clamping ring 46 is a formed metal part having a first retainer 15 in the form of a lip 47 designed to be one piece with the inner clamping ring 46. The lip 47 is angled radially away from the axis of rotation 44a of the coupling arrangement, pointing outward. The first retainer 15 is a lip 47 made of the metal of the first clamping ring 10, and extends at a right angle to the axis of rotation 44a. The first retainer 15 is formed as one piece with the first clamping ring, and at least the second retainer 25 is a separate part from the clamping rings 10, 20; the first retainer 15 comprising a lip 47 made from and extending off of the first clamping ring 10 at right angles to the axis of rotation; and a perforated cap 48 holds the clamping bodies 30 longitudinally in one direction of the axis of rotation, and surrounds the axis of rotation 44a. The second retainer 25 is the perforated cap 48 that lies across from the lip 47 in a longitudinal direction of the axis of rotation 44a, and which takes up and surrounds the clamping bodies 30. The lip 47 engages the outer clamping ring 45 by a ring-shaped segment 49 that is oriented longitudinally to the axis of rotation 44a, and which forms the frontal part of the outer clamping ring 45. The perforated cap 48 includes a tongue 50 pointing from the perforated cap 48 at an outer radial portion thereof, which engages the outer clamping ring 45 by a recess 51 of a cut out segment 51a turned longitudinally away from the ring-shaped segment 49. The second clamping ring 20 may be fixed about the axis of rotation 44a relative to a machine part 6 by means of an actuating element or actuator 40, where the actuator 40 includes the tongue 50 and is designed separately from the clamping bodies 30, and thereby held longitudinally to the first clamping ring 10 in at least one longitudinal direction of the axis of rotation 44a. The tongue 50 juts out of the recess and longitudinally over the second clamping ring 20 in its path away from the cut-out segment in a longitudinal direction of the axis of rotation 44a.

The perforated cap 48 is held longitudinally to the inner clamping ring 46 by means of an additional lip 58, so that the inner clamping ring 46, the clamping bodies 30, the perforated cap 48 and the outer clamping ring 45 are held together in a single assembly part.

Figure 15:
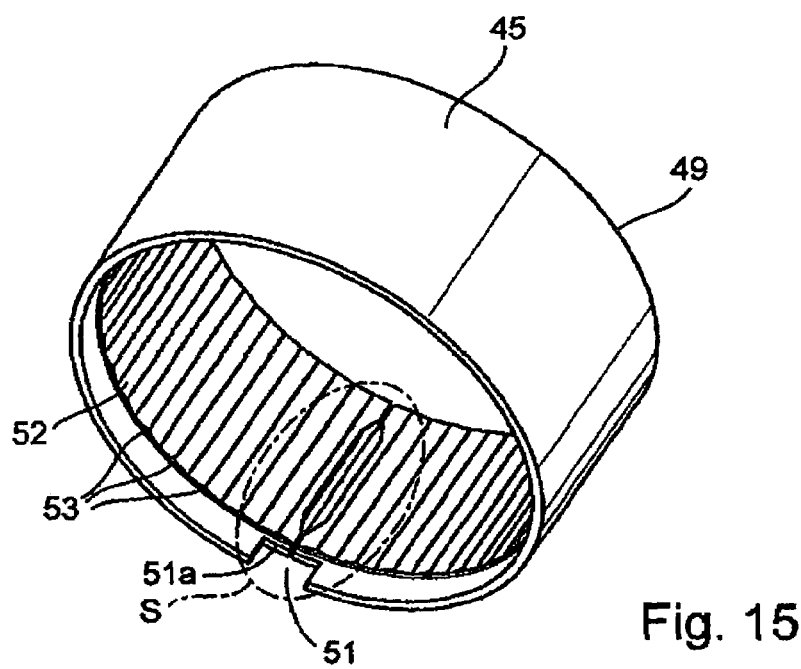
FIG. 15 is a view of the outer coupling ring of the coupling arrangement corresponding to FIG. 14.
Figure 14A:
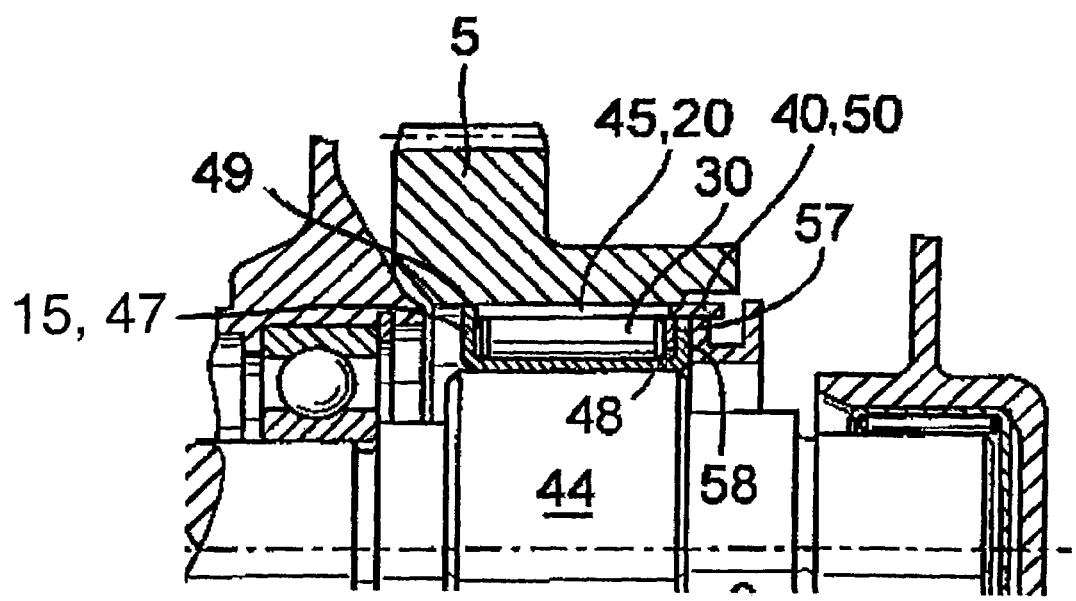
FIG. 14A is an enlarged view of a portion of FIG. 14.
Figure 15A:
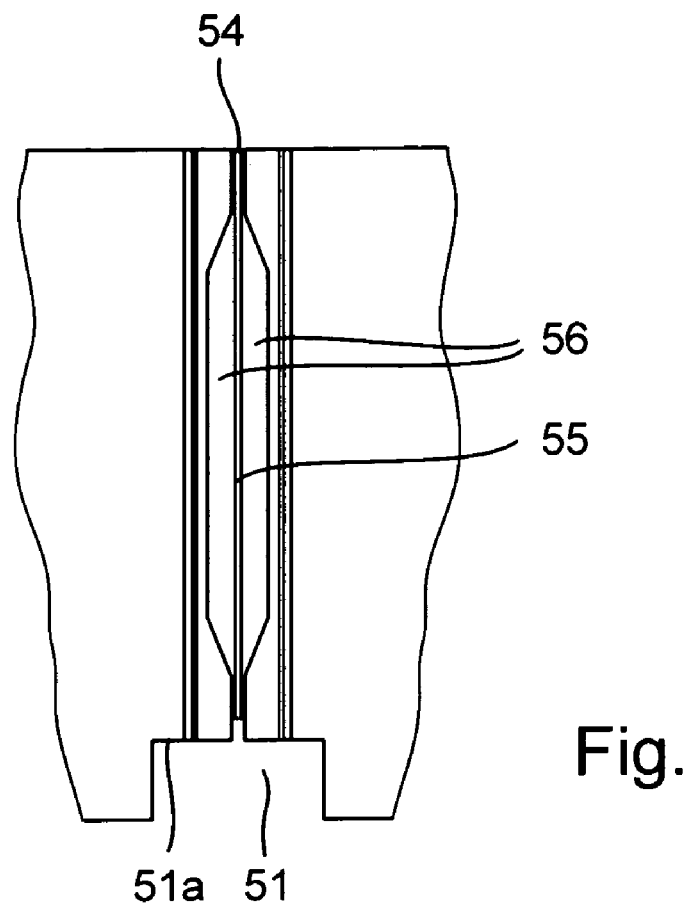
FIG. 15a is an enlarged view of detail S from FIG. 15.
Figure 15B:
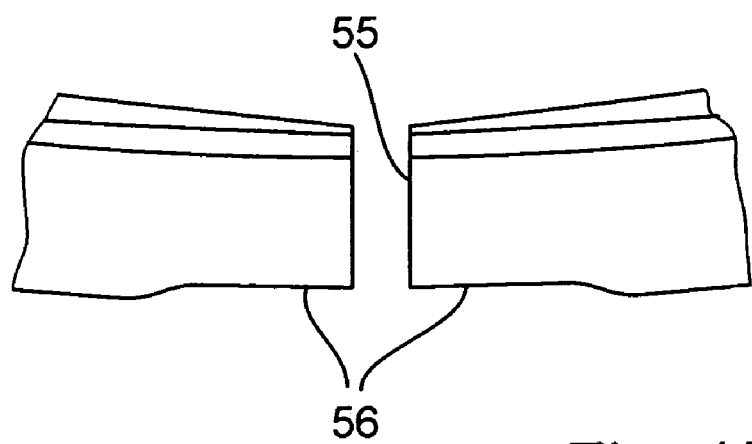
FIG. 15b is a detail of the outer coupling ring corresponding to FIG. 15.

The outer clamping ring 45 is a slipper ring with ramp-like projections 53 that extend out radially from the bearing surface 52 (FIG. 15). The slipper ring is grooved 54 all around (FIGS. 15, 15a, and 15b). The second clamping ring is a formed metal part that is closed at first. The outer clamping ring 45 is made with a predetermined breaking point 55, against which the wall of the outer clamping ring 45 is diminished and partially cut through by means of an outwardly stamped surface 56 (FIGS. 15a, 15b). During the heat treatment, the outer clamping ring 45 is at first locked to the predetermined breaking point and thereby stabilized. The predetermined breaking point 55 of the outer clamping ring 45 is broken, so that the fitting becomes grooved.

On an unengaged coupling arrangement 44, the first clamping ring 10 and the second clamping ring 20 are at first fitted firmly to the shaft 6. The gearwheel 5 is fixed to the second clamping ring 20, designed as an outer, clamping ring 45, in such a way that it may be rotated relative to the axis of rotation 44a. A catch 57 engages into the recess 51 designed to function as an actuating element 40. The coupling arrangement 44 may be engaged by means of the catch 57 pivoting clockwise or counter-clockwise about the angle φ/2. In so doing, the clamping bodies 30 clamp between the first clamping ring 10 and the second clamping ring 20. The second clamping ring 20 springs up elastically in such a way that the outer clamping ring 45 is brought into frictional contact with the gearwheel 5. The shaft 6 then has a firm turning connection to the cogwheel 5 through the coupling arrangement 44 activated by the catch 57.

REFERENCE MARKINGS

1. Coupling arrangement
1a Axis of rotation
2 Outer clamping ring
3 Inner clamping ring
4 Cylinder
5 Gear wheel
6 Shaft
7 Bearing surface
8 Bearing surface
9 Projection
10 First clamping ring
11 Projection
12 Groove
13 Tongue
14 Catch
15 First Retainer
16 Lip
17 Cut-out segment
18 Perforated cap
19 Lip
20 Second clamping ring
21 Cut-out segment
22 Recess
23 Coupling arrangement
23a Axis of rotation
24 Outer clamping ring
25 Second retainer
26 Inner clamping ring
26a Bearing surface
27 Groove
27a Recess
27b Predetermined breaking point
28 Lip 28a Edge
28b Ring segment (cut out)
29 Perforated cap
30 Clamping body
31 Cut out segment
32 Tongue
32a Catch
33 Recess
33a Cut out segment
34 Lip
35 Recess
36 Edge
37 Edge
38 Projection
39 Cut out segment
40 Actuating element
41 Projection
42 Cut out segment
43 Cut out segment
44 Coupling arrangement
44a Axis of rotation
45 Outer clamping ring
46 Inner clamping ring
47 Lip
48 Perforated cap
49 Ring segment
50 Tongue
51 Recess
52 Bearing surface
53 Cog
54 Groove
55 Predetermined breaking point
56 Indentation
57 Catch
58 Lip

The invention claimed is:

1. A coupling arrangement comprising:
a first clamping ring concentric with an axis of rotation;
a second clamping ring oriented concentrically with the axis of rotation and grooved around its circumference;
clamping bodies oriented radially between the clamping rings;
at least the second clamping ring includes a bearing surface, which faces the clamping bodies, and includes radial, ramp-shaped projections, each of which are positioned between two neighboring clamping bodies; and the second clamping ring may be at least be brought into frictional contact with a machine part, and at least a first retainer and a second retainer are connected to one of the clamping rings in at least one longitudinal direction of the axis rotation, holding the clamping rings and the clamping bodies together longitudinally to the axis of rotation by the retainers and wherein the clamping rings are formed of sheet metal parts;
wherein the retainers are spaced apart from each other in a longitudinal direction of the axis of rotation, and are fastened to a clamping ring in at least one direction longitudinal to the axis rotation; the retainers engage the other clamping ring by a segment thereof, and hold the clamping bodies longitudinally between them, at least partially; and
wherein at least the first retainer is formed in one piece with the first clamping ring.

2. Coupling arrangement as in claim 1, wherein at least the second retainer is a separate part from the clamping rings, and is held longitudinally to the first clamping ring in at least one longitudinal direction of the axis of rotation.

3. Coupling arrangement as in claim 2, wherein the second retainer is a perforated cap, whereby the perforated cap is located adjacent to the clamping bodies longitudinally in one direction and thereby surrounds the axis of rotation.

4. Coupling arrangement as in claim 3, further comprising at least one tongue protruding from the perforated cap, the tongue engages the second clamping ring by the at least one segment, and which is oriented in one direction of the axis of rotation.

5. Coupling arrangement as in claim 1, wherein the first retainer is a lip made from the metal of the first clamping ring, and extends from the first clamping ring at right angles to an axis of rotation of the clamping rings.

6. Coupling arrangement as in claim 1, wherein at least the second retainer is a separate part from the clamping rings, and is held to the first clamping ring in at least one longitudinal direction of the axis of rotation.

7. Coupling arrangement as in claim 1, wherein the second clamping ring may be fixed about the axis of rotation relative to a machine part by an actuating element; the actuating element comprises a recess in the second clamping ring and the recess extends into the second clamping ring from a longitudinal of the axis of rotation; and where the recess may be pivoted about the axis of rotation, relative to the first clamping ring.

8. Coupling arrangement as in claim 1, where the second clamping ring may be fixed about an axis of rotation relative of the clamping rings relative to a machine part by means of an actuating element, where the actuating element is formed separately from the clamping bodies, and held longitudinally to the first clamping ring in at least one longitudinal direction of the axis of rotation.

9. Coupling arrangement as in claim 8 wherein the actuating element is formed with one of the retainers, the one of the retainers comprising a perforated cap which is formed with a tongue protruding from the perforated cap at a radial portion thereof; the perforated cap is held to the first clamping ring in at least one longitudinal direction of the axis of rotation of the clamping rings; and the perforated cap holds the clamping bodies longitudinally, surrounding the axis of rotation, and the tongue engages the second clamping ring by a segment cut out of a recess.

10. Coupling arrangement as in claim 9, wherein the tongue extends longitudinal direction of the axis of rotation.

11. A coupling arrangement comprising:
a first clamping ring concentric with an axis of rotation;
a second clamping ring oriented concentrically with the axis of rotation and grooved around its circumference;
clamping bodies oriented radially between the clamping rings;
wherein at least the second clamping ring includes a bearing surface, which faces the clamping bodies, and includes radial, ramp-shaped projections, each of which are positioned between two neighboring clamping bodies; and the second clamping ring may be at least be brought into frictional contact with a machine part, and at least a first retainer and a second retainer are connected to one of the clamping rings in at least one longitudinal direction of the axis of rotation, holding the clamping rings and the clamping bodies together longitudinally to the axis of rotation by the retainers and wherein the clamping rings are formed of sheet metal parts;
the retainers are spaced apart from each other in a longitudinal direction of the axis of rotation, and are fastened to a clamping ring in at least one direction longitudinally to the axis of rotation; the retainers engage the other clamping ring by a segment thereof, and hold the clamping bodies longitudinally between them, at least partially, at least the second retainer is a separate part from the clamping rings, and is held to the first clamping ring in at least one longitudinal direction of the axis of rotation; and wherein the second retainer is a perforated cap, whereby the perforated cap is located adjacent to the clamping bodies longitudinally in one direction and thereby surrounds the axis of rotation.

12. Coupling arrangement as in claim 11, further comprising at least one tongue protruding from the perforated cap, the tongue engages the second clamping ring by at least one cut-out segment oriented in a direction of the axis of rotation.

13. Coupling arrangement as in claim 12, wherein the cut-out segment, is formed from a recess in the second clamping ring, the recess in a direction from the longitudinal of the axis of rotation into the second clamping ring.

14. Coupling arrangement comprising:
a first clamping ring concentric with an axis of rotation;
a second clamping ring oriented concentrically with the axis of rotation and grooved around its circumference;
clamping bodies oriented radially between the clamping rings,
at least the second clamping includes a bearing surface, which faces the clamping bodies, and includes radial, ramp-shaped projections, each of which are positioned between two neighboring clamping bodies; and the second clamping ring may be at least be brought into frictional contact with a machine part, and at least a first retainer and a second retainer are connected to one of the clamping rings in at least one longitudinal direction of the axis of rotation, thereby holding the clamping rings and the clamping bodies together longitudinally to the axis of rotation by the retainers and wherein the clamping rings are formed of sheet metal parts;

wherein the retainers are spaced apart from each other in a longitudinal direction of the axis of rotation, and are fastened to a clamping ring in at least one direction longitudinal to the axis of rotation; the retainers engage the other clamping ring by a segment thereof; and thereby half the clamping bodies longitudinally between them, at least partially; and wherein at least the first retainer is formed as one piece with the first clamping ring, and at least the second retainer is a separate part from the clamping rings; the first retainer comprising a lip made form and extending off of the first clamping ring at right angles to an axis of rotation of the clamping rings; and the second retainer is a perforated cap which holds the clamping bodies longitudinally in one direction of the axis of rotation, and surrounds the axis of rotation.

15. Coupling arrangement as in claim 14, further comprising at least one tongue protruding from the perforated cap, the tongue engages the second clamping ring by at least one cut-out segment pointing in one direction with the axis of rotation.

16. Coupling arrangement as in claim 15, wherein the cut-out segment, comprises a recess in the second clamping ring, where the recess extends longitudinally into the second clamping ring in a longitudinal direction of the axis of rotation.

* * * * *